United States Patent [19]
Taneya

[11] Patent Number: 5,722,696
[45] Date of Patent: Mar. 3, 1998

[54] EASY-CONNECT-AND-DISCONNECT TUBE COUPLING

[75] Inventor: Yoshimoto Taneya, Ibaraki-ken, Japan

[73] Assignee: SMC Kabushiki Kaisha, Tokyo, Japan

[21] Appl. No.: 790,994

[22] Filed: Jan. 30, 1997

Related U.S. Application Data

[63] Continuation of Ser. No. 515,066, Aug. 14, 1995, abandoned.

[30] Foreign Application Priority Data

Apr. 13, 1995 [JP] Japan ................................ 7-088502

[51] Int. Cl.$^6$ ............................................. F16L 37/08
[52] U.S. Cl. ....................... 285/39; 385/322; 385/323
[58] Field of Search ............................. 285/39, 322, 323

[56] References Cited

U.S. PATENT DOCUMENTS

| | | | |
|---|---|---|---|
| 3,653,689 | 4/1972 | Sapy et al. | 285/323 |
| 3,743,326 | 7/1973 | Courtot et al. | 285/323 |
| 3,909,046 | 9/1975 | Legris | 285/39 |
| 4,431,216 | 2/1984 | Legris | 285/323 |
| 4,696,497 | 9/1987 | Schwarzensteiner | 285/323 |
| 4,890,865 | 1/1990 | Hosono et al. | 281/133.1 |
| 4,895,395 | 1/1990 | Ceriani | 285/39 |
| 5,029,908 | 7/1991 | Belisaire | 285/323 |
| 5,160,179 | 11/1992 | Takagi . | |
| 5,230,539 | 7/1993 | Olson | 285/323 |
| 5,370,423 | 12/1994 | Guest | 285/39 |

FOREIGN PATENT DOCUMENTS

| | | |
|---|---|---|
| 0 378 035 | 7/1990 | European Pat. Off. . |
| 0 379 655 | 8/1990 | European Pat. Off. . |
| 2 712 063 | 5/1995 | France . |

*Primary Examiner*—Eric K. Nicholson
*Attorney, Agent, or Firm*—Oblon, Spivak, McClelland, Maier & Neustadt, P.C.

[57] ABSTRACT

A tube coupling which allows a fluid tube to be easily connected to and disconnected therefrom includes a cylindrical coupling body, a chuck disposed in the coupling body and having engaging portions on its distal end for gripping a fluid tube inserted in the coupling body, a guide member for holding the chuck therein for sliding movement in a predetermined axial stroke, the guide member having cylindrical slanted inner surfaces in substantial alignment with a proximal portion of the engaging portions of the chuck, a release bushing disposed in the coupling body for insertion between the fluid tube inserted in the coupling body and the chuck for spreading the engaging portion out of gripping engagement with the fluid tube, a gasket disposed in the coupling body for sealing a distal end of the fluid tube with respect to an inner wall of the coupling body. The chuck has bulging portions projecting radially outwardly from the proximal portions of the engaging portions. When the bulging portions are drawn into the guide member, the bulging portions are slidingly engaged and pushed by the slanted inner surfaces, causing the engaging portions of the chuck to be displaced radially inwardly into gripping engagement with the fluid tube. The axial stroke which the chuck is slidable is limited by the guide member to a range in which the engaging portions are kept out of contact with the gasket.

6 Claims, 11 Drawing Sheets

EASY-CONNECT-AND-DISCONNECT TUBE COUPLING

This application is a Continuation of application Ser. No. 08/515,066, filed on Aug. 14, 1995, now abandoned.

BACKGROUND OF THE INVENTION

1. Field of the Invention

The present invention relates to a tube coupling for connecting a fluid tube having a fluid passage for introducing or discharging a fluid to a fluid pressure device such as a solenoid-operated valve, a cylinder, or the like.

2. Description of the Related Art

There have heretofore been employed tube couplings for connecting a fluid tube to a fluid pressure device such as a solenoid-operated valve, a cylinder, or the like.

FIG. 9 of the accompanying drawings shows a conventional tube coupling 100 having a first hole 104 defined in a lower portion of a cylindrical coupling body 102 and extending axially thereof, a larger-diameter second hole 108 defined in the coupling body 102 upwardly of the first hole 104 and communicating coaxially with the first hole 104 through a first step 106, and a larger-diameter third hole 112 defined in the coupling body 102 upwardly of the second hole 108 and communicating coaxially with the second hole 104 through a second step 110. The coupling body 102 also has a cylindrical slanted surface 114 which spreads radially outwardly in the upward direction above an inner wall that defines the third hole 112, a larger-diameter fourth hole 116 defined above the slanted surface 114 coaxially with the third hole 112, and a smaller-diameter fifth hole 120 defined in the coupling body 102 upwardly of the fourth hole 116 and communicating coaxially with the fourth hole 116 through a third step 118. The fifth hole 120 opens at an upper surface of the coupling body 112.

A guide member 122 which is fitted in an inner wall that defines the fifth hole 120 has an annular ledge 124 disposed on an outer circumferential surface thereof and engaging the third step 118, and a lower end 125 engaging the slanted surface 114 of the coupling body 102. A collet 126 has an upper slanted surface 128 fitted in the lower end 125. The collet 126 also has an annular ridge 130 disposed on an inner circumferential surface thereof and projecting radially inwardly.

A cylindrical chuck 132 made of a resilient material such as sheet metal is fitted in the collet 126 and has a plurality of slits 134 defined in a lower portion thereof and extending upwardly from a lower end thereof. The lower end of the chuck 132 has a tapered engaging portion 136 whose diameter is progressively reduced downwardly and which has an outer wall engaged by the ridge 130 of the collet 126. The engaging portion 136 and the collet 126 are held in abutment against an elastomeric gasket 138 that is disposed on the second step 110 of the coupling body 102. A release bushing 140 is vertically movably inserted in the chuck 132 and has a distal end 142 held in engagement with the engaging portion 136 of the chuck 132. The release bushing 140 has a hole 144 defined therein which has a diameter equal to the outside diameter of a fluid tube 148 (see FIG. 10 of the accompanying drawings) to be connected to the tube coupling 100. The release bushing 140 has a flange 146 disposed on an upper end thereof and projecting radially outwardly.

As shown in FIG. 10, when the fluid tube 148, which is made of a flexible material such as synthetic resin, is to be connected to the tube coupling 100, the fluid tube 148 is inserted into the hole 144 in the release bushing 140. As the fluid tube 148 moves in, a distal end 150 thereof pushes and spreads the engaging portion 136 of the chuck 132, and is engaged by and positioned on the first step 106 of the coupling body 102. At this time, the gasket 138 is pressed and elastically deformed radially outwardly by the engaging portion 136 and an outer circumferential surface of the fluid tube 148. When forces are applied in an upward direction to pull out the fluid tube 148, the chuck 132 is displaced upwardly with the fluid tube 148, and the slanted surface 128 of the collet 126 is wedged into the gap between the guide member 122 and the chuck 132. The ridge 130 of the collet 126 now presses the engaging portion 136, which is displaced radially inwardly under the resilience of the chuck 132, gripping the outer circumferential surface of the fluid tube 148. The fluid tube 148 is now retained against removal by the tube coupling 100 as shown in FIG. 11 of the accompanying drawings. When the fluid tube 148 is to be detached from the tube coupling 100, the flange 146 of the release bushing 140 is pressed downwardly until the distal end 142 thereof displaces the engaging portion 136 radially outwardly out of gripping engagement with the fluid tube 148. The fluid tube 148 can now be pulled from the tube coupling 100 as shown in FIG. 12 of the accompanying drawings.

Upon insertion of the fluid tube 148 into the tube coupling 100, the fluid tube 148 presses and displaces the engaging portion 136 of the chuck 132, which in turn presses and displaces the gasket 138. Therefore, the fluid tube 148 is subjected to resilient forces from both the chuck 132 and the gasket 138. Since the outer circumferential surface of the fluid tube 148 also directly presses and displaces the gasket 138, the fluid tube 148 is also subjected to direct resilient forces from the gasket 138. Therefore, when the fluid tube 148 is inserted into the tube coupling 100, it is necessary to impose large forces sufficient to overcome these resilient forces. When the flange 146 of the release bushing 140 is pressed downwardly for removal of the fluid tube 148, the distal end 142 of the release bushing 140 presses and displaces the engaging portion 136 of the chuck 132, which in turn presses and displaces the gasket 138. Therefore, the fluid tube 148 is subjected to resilient forces from both the chuck 132 and the gasket 138. Accordingly, when the fluid tube 148 is removed from the tube coupling 100, it is necessary to apply large forces sufficient to overcome these resilient forces. The flange 146 is required to be so shaped as to allow the user to press the flange 148 with ease and transmit forces with high efficiency.

The conventional tube coupling 100 is highly expensive to manufacture because it is made up of many parts.

SUMMARY OF THE INVENTION

It is therefore an object of the present invention to provide a tube coupling which allows a fluid tube to be easily connected to and disconnected therefrom, is made up of a reduced number of parts, and can be manufactured inexpensively.

To achieve the above object, there is provided in accordance with the present invention a tube coupling comprising a cylindrical coupling body, a chuck disposed in said cylindrical coupling body and having an engaging portion on a distal end thereof for gripping a tube inserted in the cylindrical coupling body, guide means for holding said chuck slidably therein, said guide means having a cylindrical slanted inner surface in substantial alignment with a proximal portion of said engaging portion of the chuck, a release bushing disposed in said cylindrical coupling body for insertion between the tube inserted in the cylindrical coupling body and said chuck, and a gasket disposed in said cylindrical coupling body for sealing a distal end of the tube with respect to an inner wall of said cylindrical coupling body, said chuck having a bulging portion projecting radially outwardly from the proximal portion of said engaging portion, the arrangement being such that when said bulging portion is drawn into said guide means, the bulging portion is slidingly engaged and pushed by said cylindrical slanted inner surface, causing said engaging portion of the chuck to be displaced radially inwardly into gripping engagement with the tube inserted in said cylindrical coupling body.

The guide means may comprise a guide member fixedly disposed coaxially in said cylindrical coupling body and having said cylindrical slanted inner surface in substantially alignment with the proximal portion of said engaging portion of the chuck, said chuck being slidably held in said guide member.

The guide means may be disposed as part of an inner wall of said cylindrical coupling body.

The chuck may have an outwardly projecting tooth on an outer circumferential surface of an opposite end thereof, said guide means having a recess or hole defined in an inner wall thereof and having a predetermined axial length, said outwardly projecting tooth being slidably disposed in said recess or hole, whereby said chuck is slidable only in a stroke depending on said predetermined axial length with respect to said guide means, said engaging portion having a distal end spaced from said gasket at all times.

With the above arrangement, when the fluid tube is inserted into the cylindrical coupling body, the distal end of the fluid tube pushes and spreads the engaging portion of the chuck. An attempt to pull out the fluid tube causes the chuck to be displaced with the fluid tube, whereupon the slanted inner surface of the guide means presses the bulging portion of the chuck. The engaging portion is displaced radially inwardly against resiliency forces of the chuck, gripping an outer circumferential wall of the fluid tube. The fluid tube is now retained against removal from the tube coupling. For pulling out the fluid tube from the tube coupling, the release bushing is pushed in. The engaging portion of the chuck is pressed and displaced radially outwardly by a distal end of the release bushing. The fluid tube is now released from the engaging portion, and can be removed from the tube coupling.

Since the engaging portion of the chuck is spaced from the gasket, the engaging portion is not brought into contact with the gasket when the fluid tube is inserted into or pulled out of the tube coupling. Therefore, forces applied to the fluid tube and the release bushing are relatively small, and hence forces required to insert or remove the fluid tube may be relatively small. Consequently, the tube coupling allows the fluid tube to be easily connected to and disconnected therefrom.

Furthermore, the tube coupling is made up of a relatively small number of parts and can be manufactured inexpensively because the tube coupling dispenses with the collet and the guide member which have heretofore been necessary in the conventional tube coupling.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
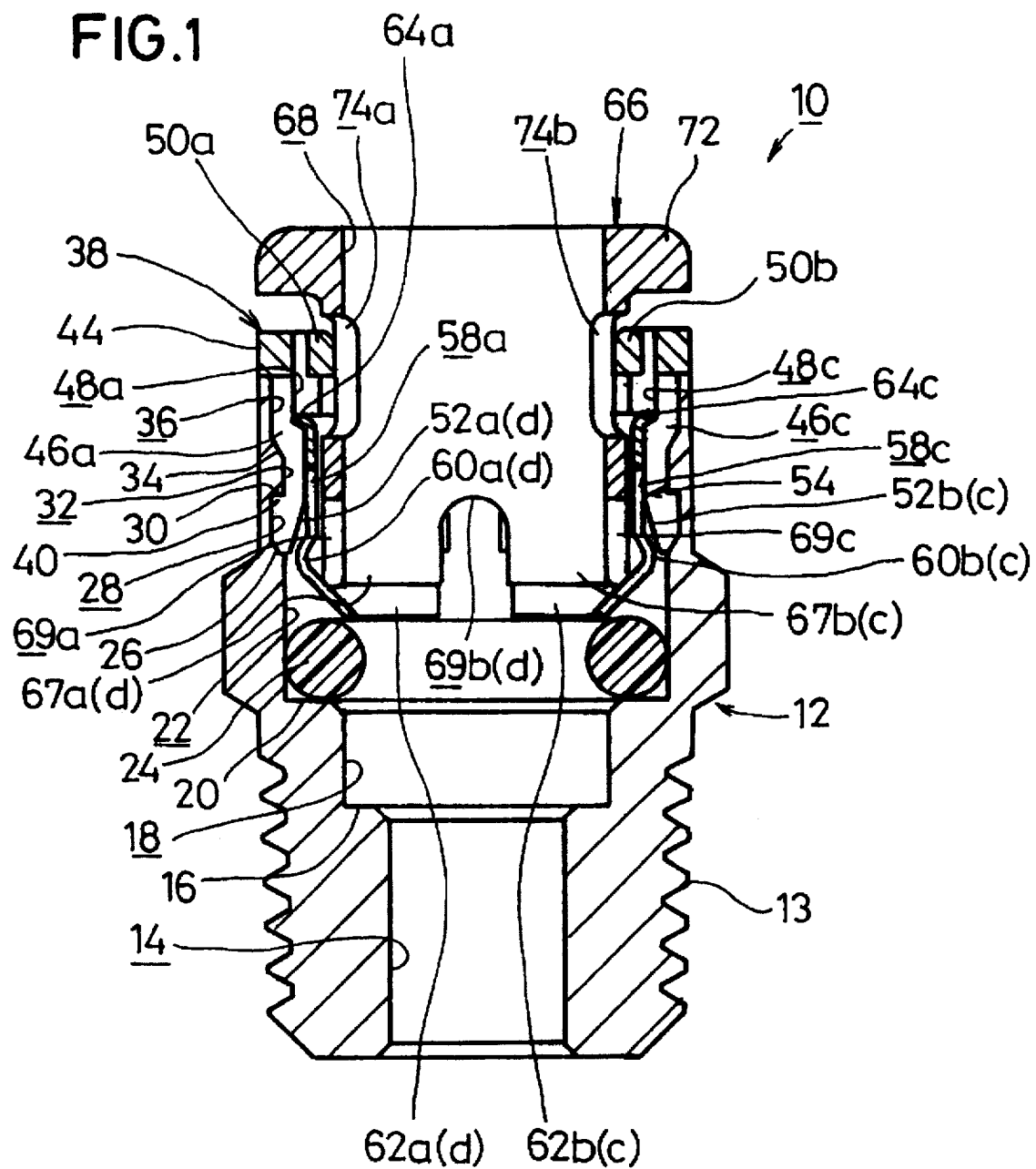
FIG. 1 is a cross-sectional view of a tube coupling according to a first embodiment of the present invention.
Figure 2:
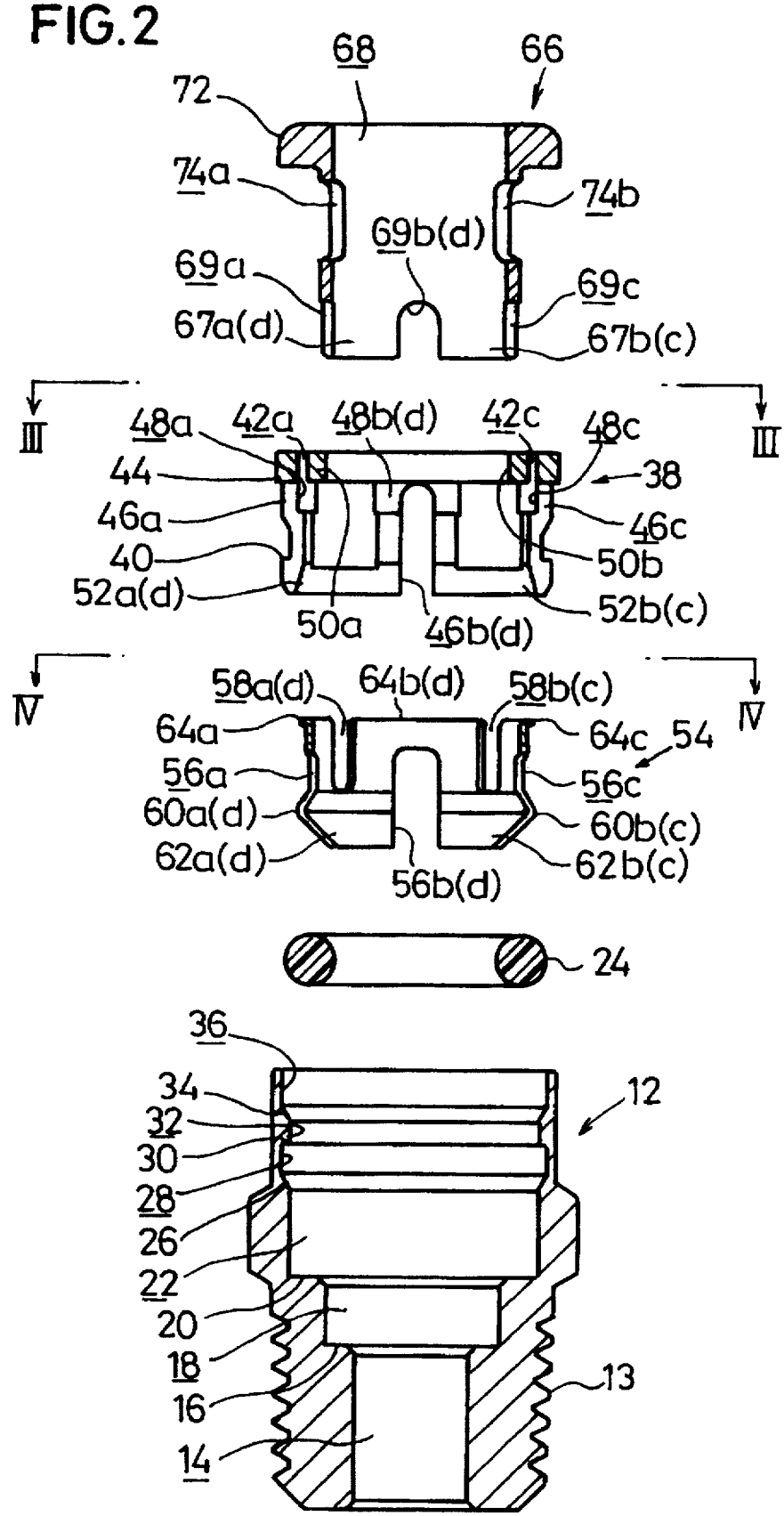
FIG. 2 is an exploded cross-sectional view of the tube coupling shown in FIG. 1.

As shown in FIGS. 1 and 2, a tube coupling 10 according to a first embodiment of the present invention includes a cylindrical coupling body 12 having an externally threaded outer wall surface 13 on its lower portion. The externally threaded outer wall surface 13 is threaded into an internally threaded inner wall surface of a fluid pressure device (not shown) such as a solenoid-operated valve, a cylinder, or the like. The tube coupling 10 has a first hole 14 defined in a lower portion of the coupling body 12 and extending axially thereof, a larger-diameter second hole 18 defined in the coupling body 12 upwardly of the first hole 14 and communicating coaxially with the first hole 14 through a first step 16, and a larger-diameter third hole 22 defined in the coupling body 12 upwardly of the second hole 18 and communicating coaxially with the second hole 18 through a second step 20.

An elastomeric gasket 24 of circular cross section is disposed on the second step 20 for preventing a fluid such as compressed air or oil flowing through a fluid tube from leaking out of the tube coupling 10. The coupling body 12 also has a first cylindrical slanted surface 26 which spreads radially outwardly in the upward direction above an inner wall that defines the third hole 22, a larger-diameter fourth hole 28 defined above the first slanted surface 26 coaxially with the third hole 22, a smaller-diameter fifth hole 32 defined in the coupling body 12 upwardly of the fourth hole 28 and communicating coaxially with the fourth hole 28 through a third step 30, and a larger-diameter sixth hole 36 defined above an inner wall that defines the fifth hole 32 and communicating coaxially with the fifth hole 32 through a second cylindrical slanted surface 34 which spreads radially outwardly in the upward direction. The sixth hole 36 opens at an upper surface of the coupling body 12.

Figure 3:
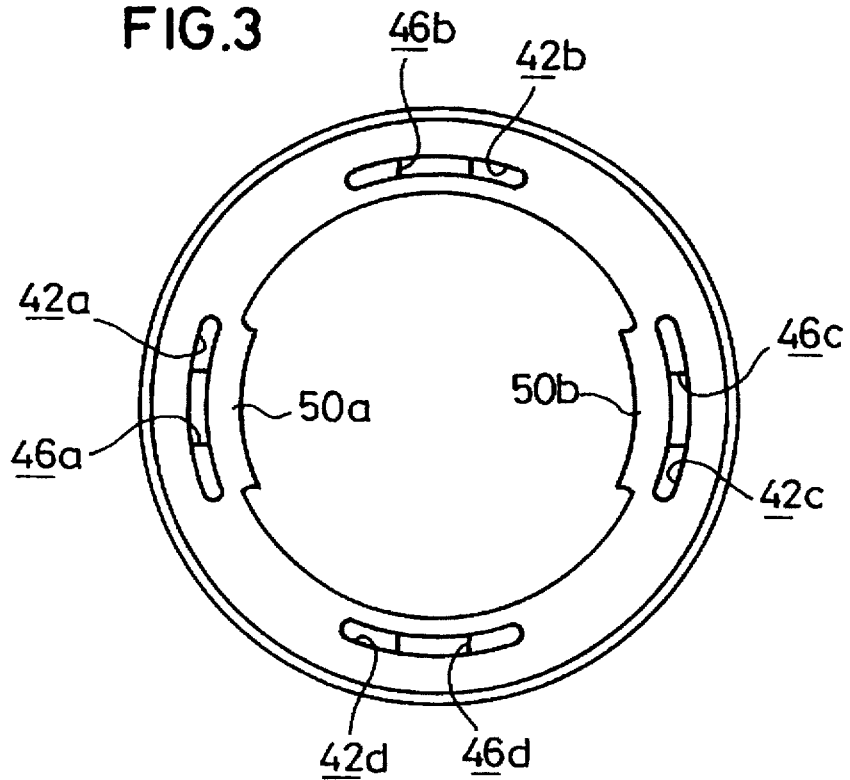
FIG. 3 is a view taken along line III—III of FIG. 2.

An annular guide member 38 made of synthetic resin which is fitted in the sixth hole 36 has an annular ledge 40 disposed on an outer circumferential surface thereof and engaging the third step 30. The guide member 38 has four concentric arcuate holes 42a–42d (see FIG. 3) defined in an upper portion thereof at 90°-spaced angular positions. The guide member 38 includes a flange 44 projecting radially outwardly from an upper end thereof, and four slits 46a–46d defined therein at 90°-spaced angular positions and extending downwardly from the flange 44 to the lower end of the guide member 38. Four recesses 48a–48d are defined in an inner wall of the guide member 38 in upper portions of the slits 46a–46b. The slits 46a–46d and the recesses 48a–48d communicate with the respective arcuate holes 42a–42d. The guide member 38 has two diametrically opposite teeth 50a, 50b projecting radially inwardly above two 48a, 48c of the recesses 48a–48d which are 180° spaced from each other. The guide member 38 also has third slanted surfaces 52a–52d on an inner wall of the lower end thereof which spread radially outwardly in the downward direction.

Figure 4:
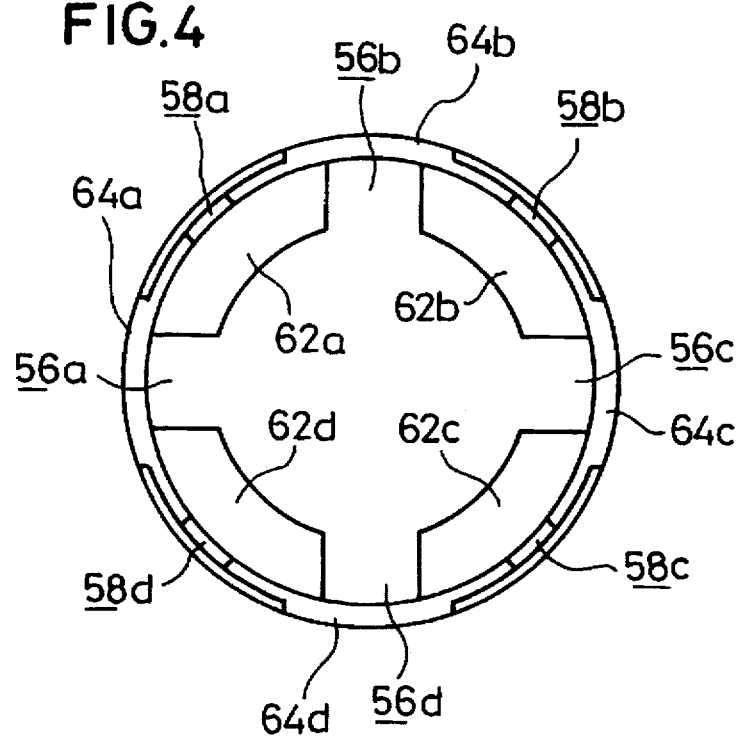
FIG. 4 is a view taken along line IV—IV of FIG. 2.

A cylindrical chuck 54 made of a resilient material such as sheet metal is vertically movably disposed in the guide member 38. The chuck 54 has four 90°-spaced first slits 56a–56d (see FIG. 4) defined therein which extending upwardly from a lower end thereof, and four second slits 58a–58d defined therein which extending downwardly from an upper end thereof, the second slits 58a–58d being 45° spaced from the respective first slits 56a–56d. The chuck 54 also has four circumferentially extending bulging portions 60a–60d projecting radially outwardly and divided by the first slits 56a–56d. The bulging portions 60a–60d include respective lower engaging portions 62a–62d which are tapered radially inwardly. The chuck 54 includes an upper end bent radially outwardly and divided by the second slits 58a–58d into four bent portions (outwardly projecting teeth) 64a–64d which are positioned above the first slits 56a–56d, respectively. The bent portions 64a–64d engage respectively in the recesses 48a–48d of the guide member 38 and are vertically movable within the recesses 48a–48d. Therefore, the chuck 54 is vertically movable in a vertical stroke that depends on the vertical dimension of the recesses 48a–48d. When the chuck 54 is inserted in the guide member 38, the engaging portions 62a–62d have respective radially inner distal ends positioned in spaced relation to the gasket 24 at all times.

A release bushing 66 is vertically movably disposed in the chuck 54. The release bushing 66 has four angularly spaced distal ends 67a–67d engaging the respective engaging portions 62a–62d of the chuck 54. The release bushing 66 has a hole 68 defined therein which has a diameter equal to the outside diameter of a fluid tube 76 (see FIG. 5) to be connected to the tube coupling 10. The release bushing 66 also has fours angularly spaced slits 69a–69d defined in a lower portion thereof and extending upwardly from a lower end thereof, the slits 69a–69d separating the distal ends 67a–67d. The release bushing 66 further includes a flange 72 disposed on an upper end thereof and projecting radially outwardly. Two openings 74a, 74b which are 180° spaced from each other are defined in an intermediate wall of the release bushing 66. The teeth 50a, 50b of the guide member 38 engage in the respective openings 74a, 74b and are slidable within the openings 74a, 74b. The teeth 50a, 50b engaging in the respective openings 74a, 74b prevent the release bushing 66 from being inserted excessively into the chuck 54.

Operation of the tube coupling 10 according to the first embodiment will be described below.

Figure 5:
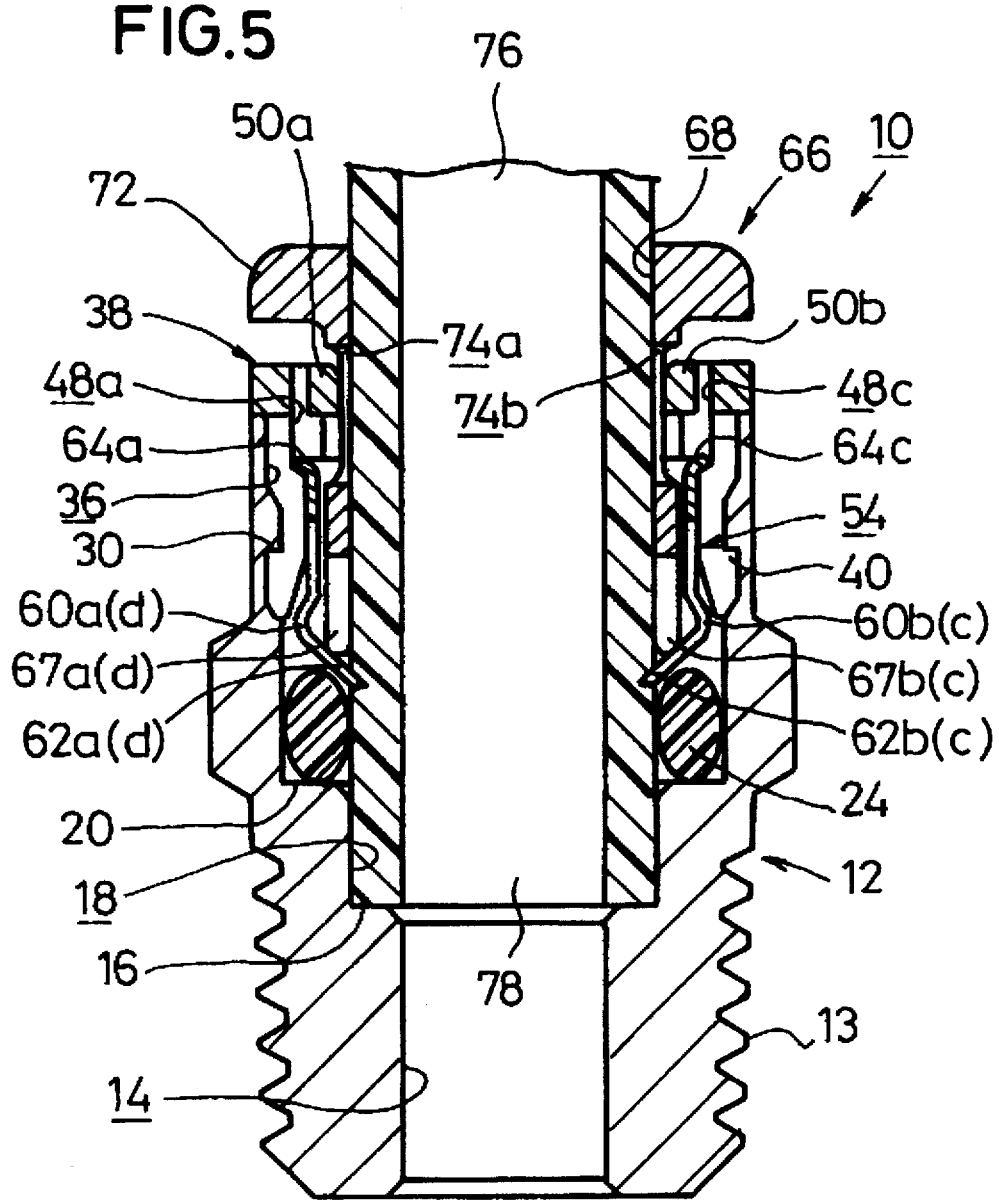
FIG. 5 is a cross-sectional view illustrating the manner in which the tube coupling shown in FIG. 1 operates.

When the fluid tube 76, which is made of a flexible material such as synthetic resin, is to be connected to the tube coupling 10, the fluid tube 76 is inserted into the hole 68 in the release bushing 60. As the fluid tube 76 moves in, a distal end 78 thereof pushes and spreads the engaging portions 62a–62d of the chuck 54, and is engaged by and positioned on the first step 16 of the coupling body 12 as shown in FIG. 5. At this time, the gasket 24 is pressed and elastically deformed radially outwardly into an elliptical cross-sectional shape by an outer circumferential surface of the fluid tube 76. Therefore, the fluid tube 76 undergoes resilient forces from the gasket 24. When the fluid tube 76 pushes and displaces the engaging portions 62a–62d of the chuck 54, the fluid tube 76 does not press the gasket 24 as the distal ends of the engaging portions 62a–62d are spaced from the gasket 24. Since the gasket 24 does not apply resilient forces to the engaging portions 62a–62d, forces required to insert the fluid tube 76 into the tube coupling 10 are smaller than would be if the fluid tube 76 engaged the gasket 24 and were pushed in while overcoming the resilient forces of the gasket 24 as is the case with the conventional tube coupling.

Figure 6:
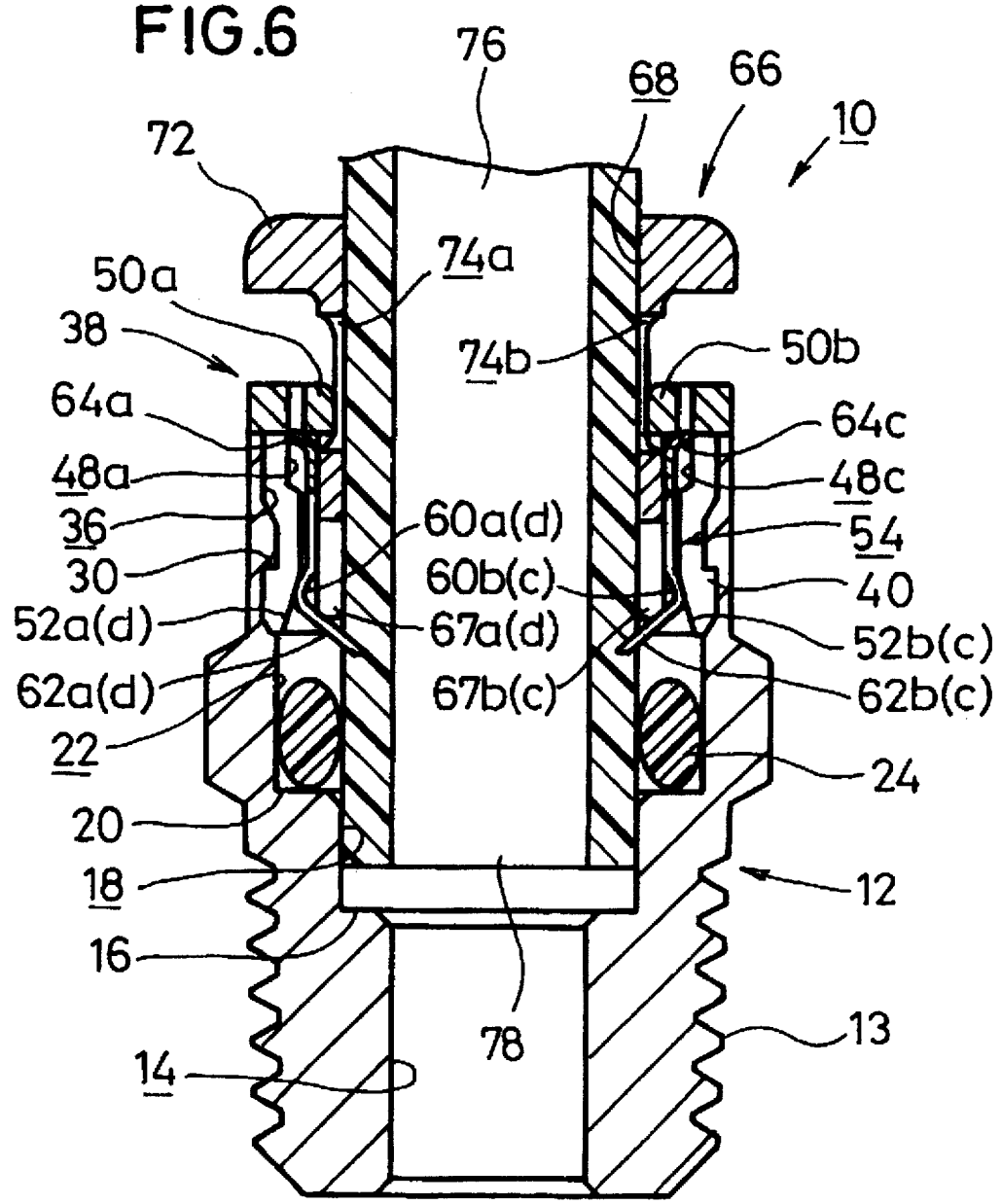
FIG. 6 is a cross-sectional view illustrating the manner in which the tube coupling shown in FIG. 1 operates.

When an attempt is made to pull out the fluid tube 76, the chuck 54 is displaced upwardly with the fluid tube 76, and the third slanted surfaces 52a–52d of the guide member 38 engage the bulging portions 60a–60d of the chuck 54. The engaging portions 62a–62d of the chuck 54 are displaced radially inwardly under reactive forces from the bulging portions 60a–60d, gripping outer circumferential surface of the fluid tube 76. The fluid tube 76 is now retained against removal by the tube coupling 10 as shown in FIG. 6.

Figure 7:
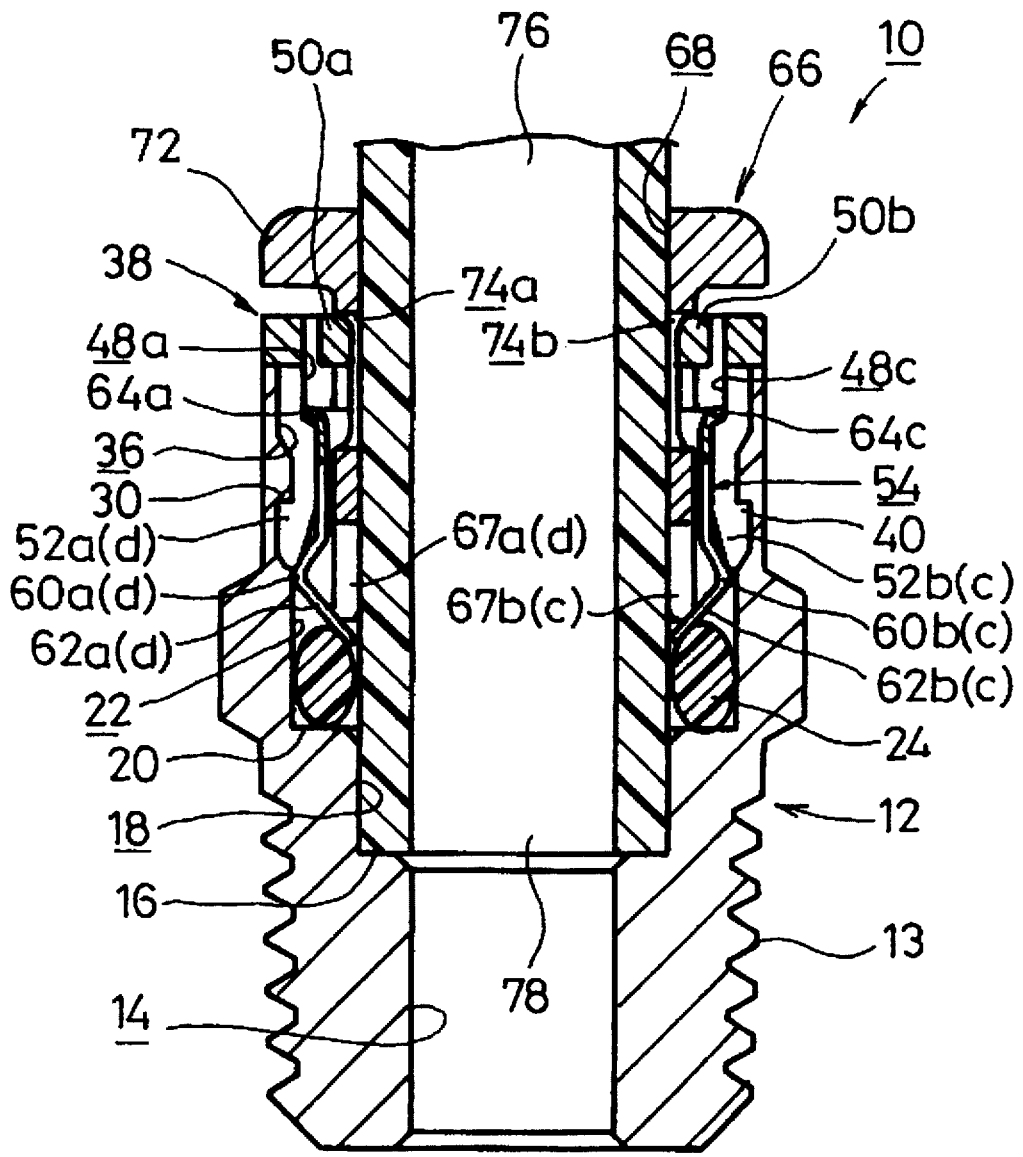
FIG. 7 is a cross-sectional view illustrating the manner in which the tube coupling shown in FIG. 1 operates.

For removing the fluid tube 76 from the tube coupling 10, the flange 72 of the release bushing 66 is pressed downwardly until the distal ends 67a–67d thereof displace the engaging portions 62a–62d of the chuck 54 radially outwardly out of gripping engagement with the fluid tube 76. The fluid tube 76 can now be pulled from the tube coupling 10 as shown in FIG. 7. Inasmuch as forces imposed on the release bushing 66 at this time are only forces tending to displace the engaging portions 62a–62d, forces required to be applied to the release bushing 66 to push it in against those forces are relatively small.

While the guide member 38 has the recesses 48a–48d in the first embodiment described above, the guide member 38 may have holes instead of these recesses 48a–48d and the bent portions (outwardly projecting teeth) 64a–64d of the chuck 54 may engage in those holes.

A tube coupling according to a second embodiment of the present invention will be described below with reference to FIG. 8. Only those parts of the tube coupling according to the second embodiment which are different from the tube coupling 10 according to the first embodiment will be described in detail below. Those parts of the tube coupling according to the second embodiment which are identical to those of the tube coupling 10 according to the first embodiment are denoted by identical reference numerals, and will not be described in detail below.

Figure 8:
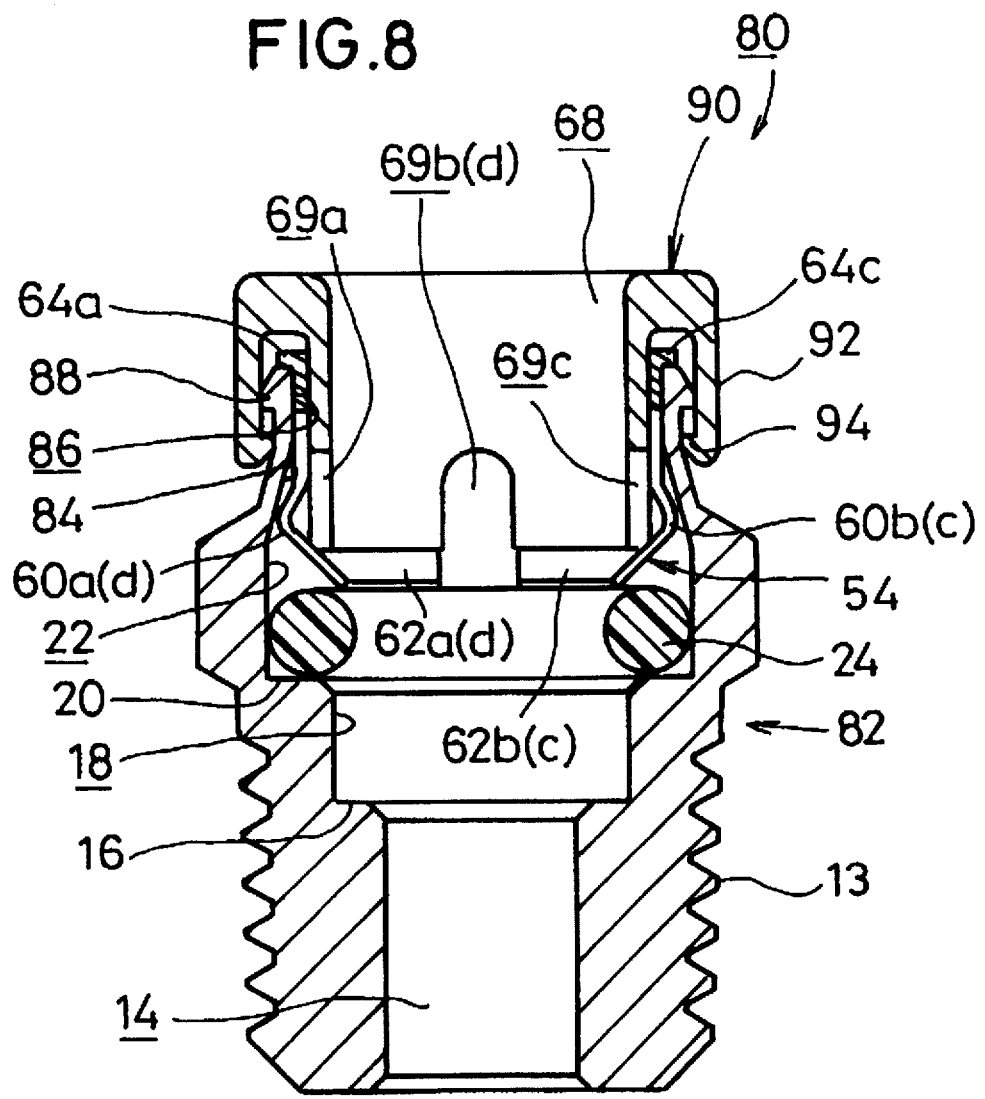
FIG. 8 is a cross-sectional view of a tube coupling according to a second embodiment of the present invention.
Figure 9:
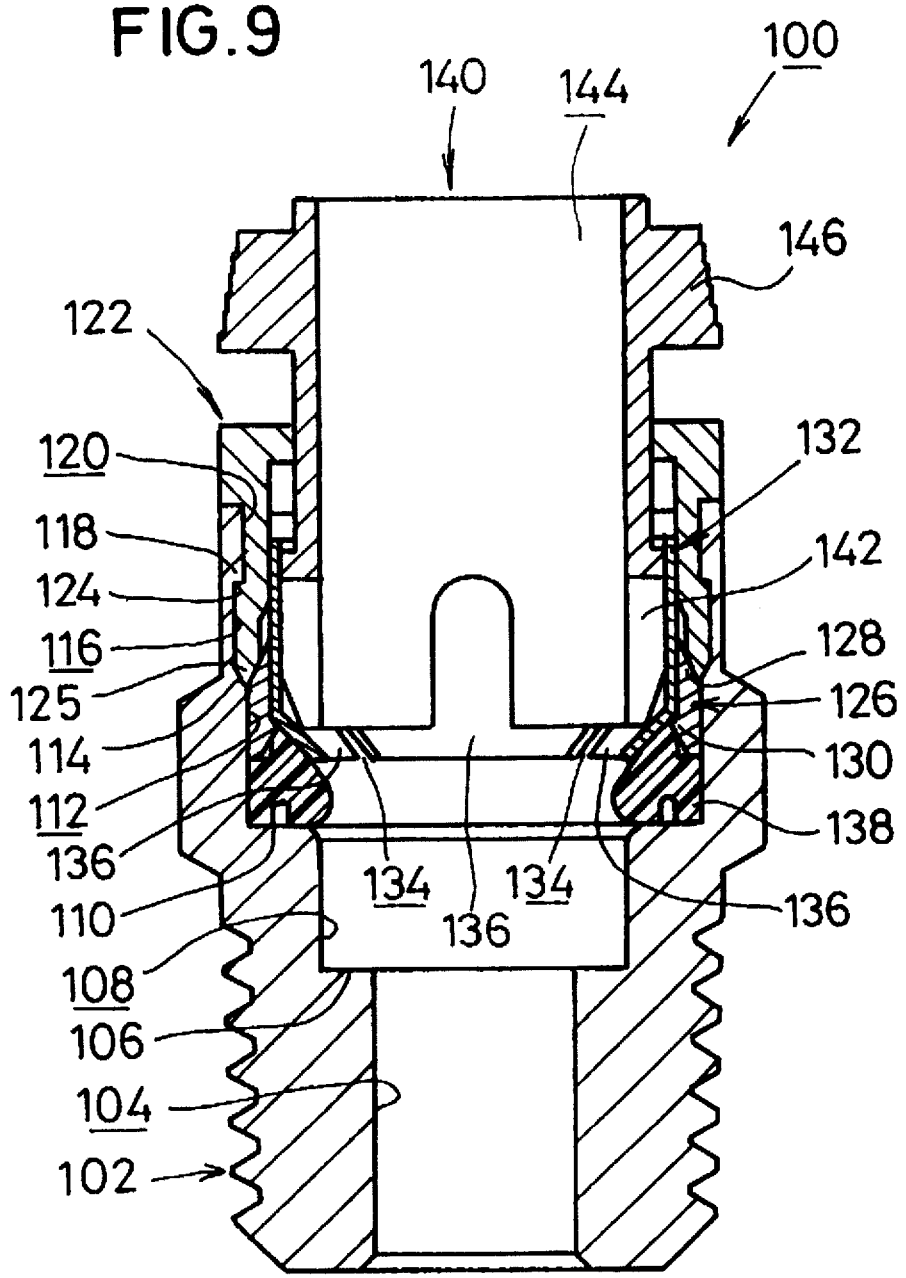
FIG. 9 is a cross-sectional view of a conventional tube coupling.
Figure 10:
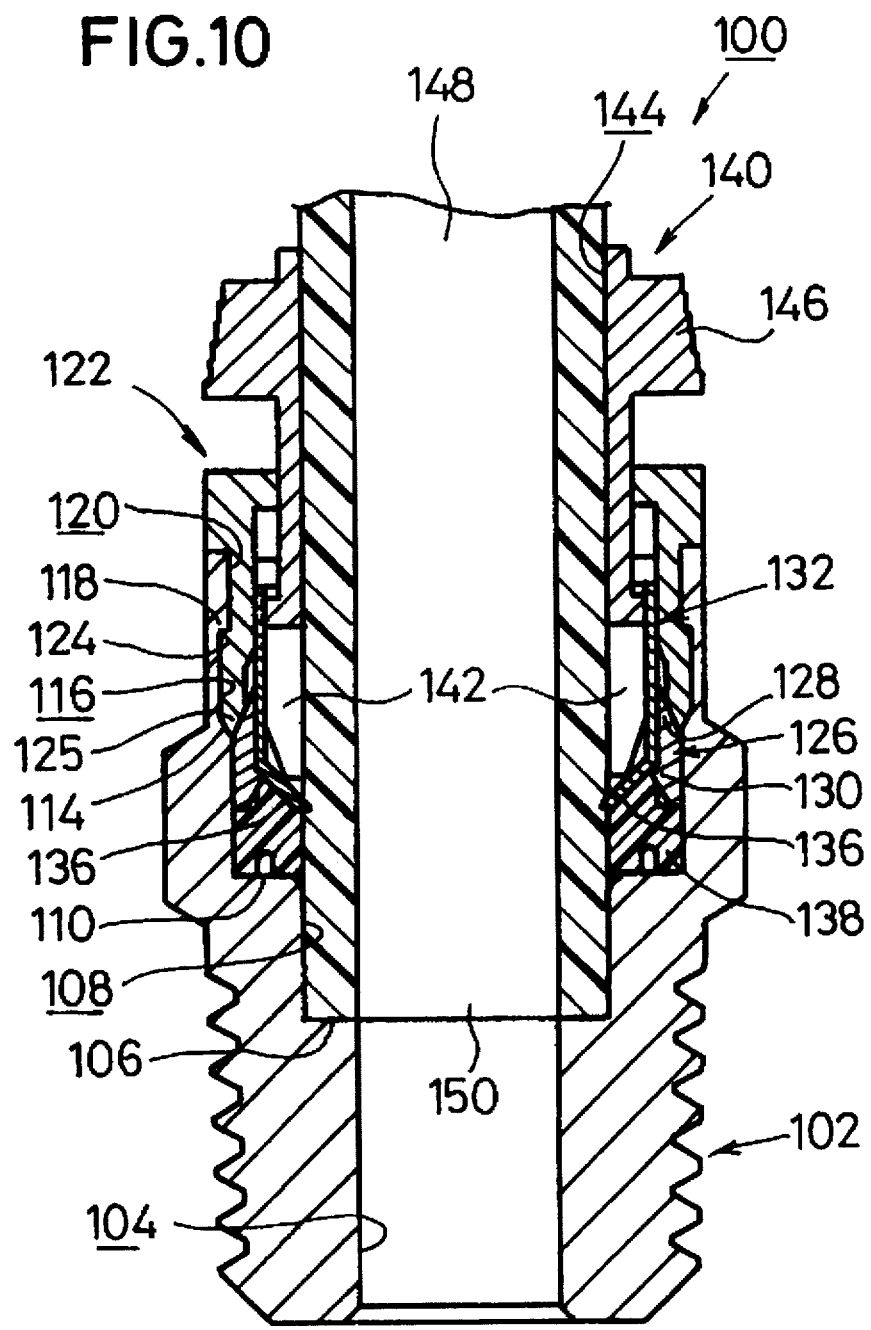
FIG. 10 is a cross-sectional view illustrating the manner in which the conventional tube coupling shown in FIG. 9 operates.
Figure 11:
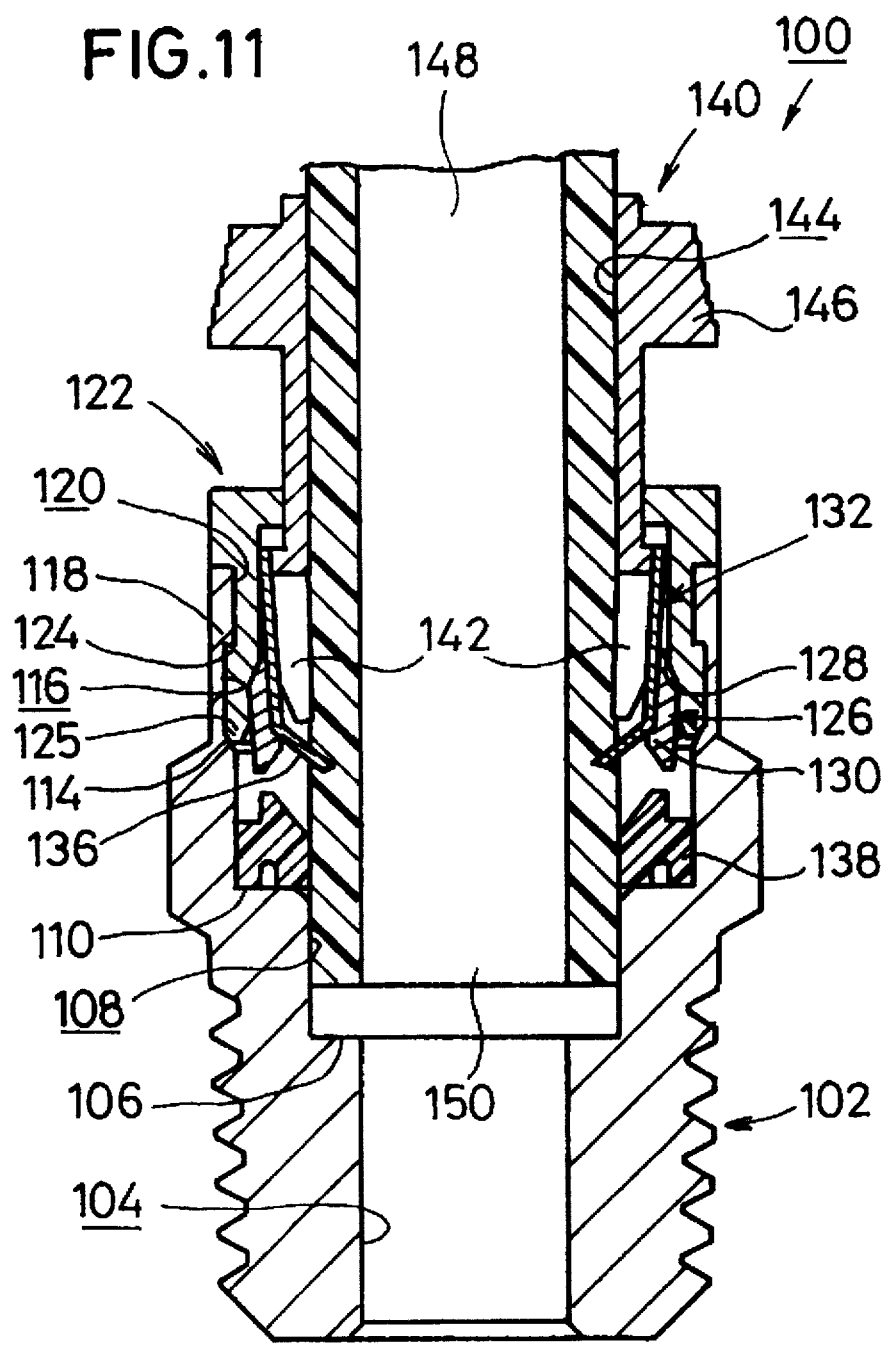
FIG. 11 is a cross-sectional view illustrating the manner in which the conventional tube coupling shown in FIG. 9 operates.
Figure 12:
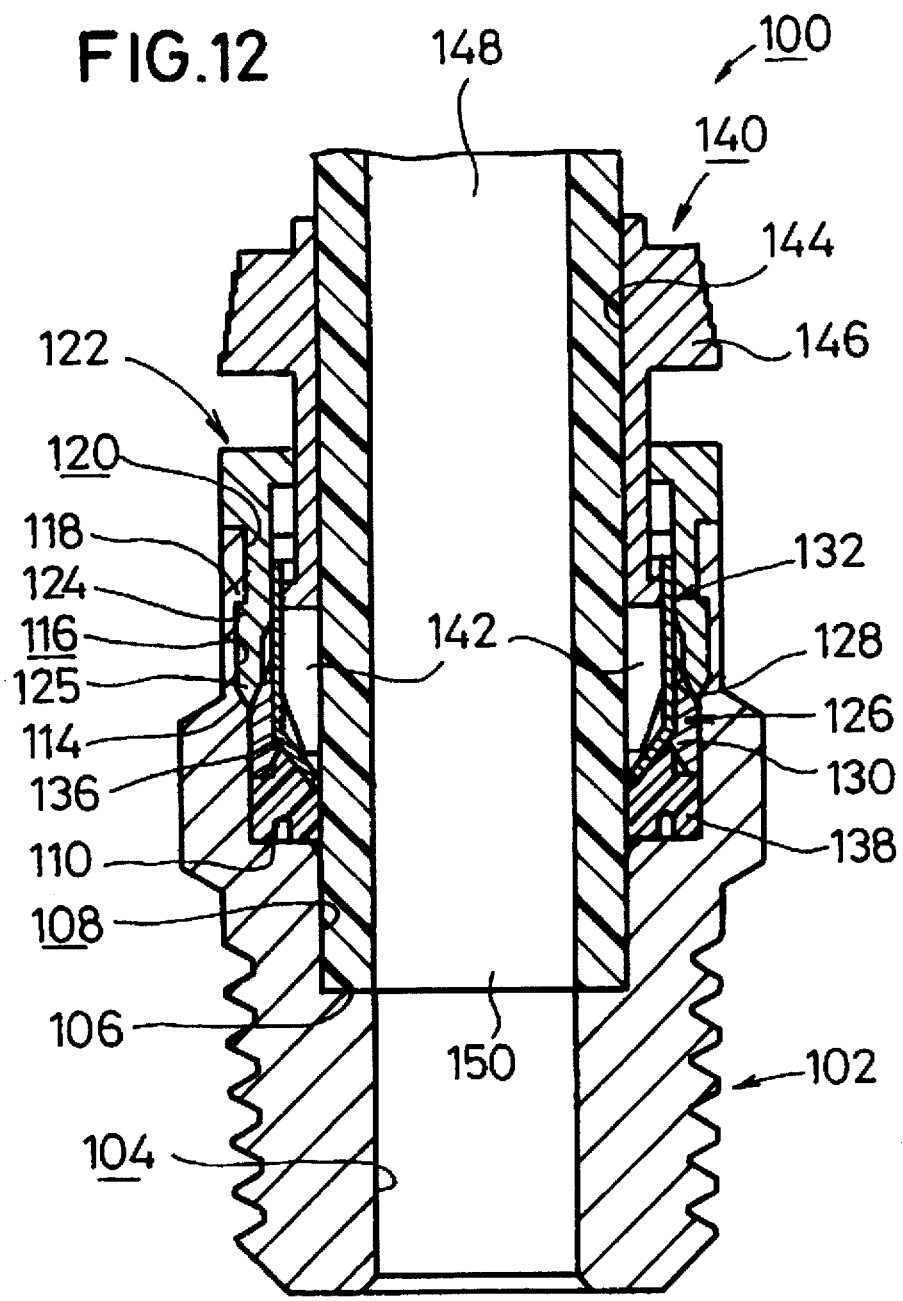
FIG. 12 is a cross-sectional view illustrating the manner in which the conventional tube coupling shown in FIG. 9 operates.

As shown in FIG. 8, the tube coupling, generally denoted at 80, has a first hole 14, a second hole 18, and a third hole 22 that are coaxially defined in a lower portion of a coupling body 82. The coupling body 82 has a fourth slanted surface 84 which contracts radially inwardly in the upward direction above an inner wall that defines the third hole 22, and a smaller-diameter seventh hole 86 defined above the fourth slanted surface 84 coaxially with the third hole 22. The seventh hole 86 opens at an upper surface of the coupling body 82. The coupling body 82 has a flange 88 projecting radially outwardly from an upper end thereof. A chuck 54 is inserted in the seventh hole 86, and has bent portions (outwardly projecting teeth) 64a–64d engaging the upper end of the coupling body 82. A release bushing 90 is vertically movably disposed in the chuck 54, and has a cylindrical member 92 extending downwardly from an upper end thereof in surrounding relation to an upper portion of the coupling body 82. The cylindrical member 92 has an annular step 94 projecting radially inwardly from a lower end thereof and held in engagement with the flange 88 of the coupling body 82 to retain the cylindrical member 92 against removal from the coupling body 82.

When an attempt is made to pull out a fluid tube, similar to the fluid tube 76 shown in FIGS. 5 through 7, inserted in the tube coupling 80, the chuck 54 is displaced upwardly with the fluid tube. The fourth slanted surface 84 of the coupling body 82 slidingly engages and presses bulging portions 60a–60d of the chuck 54. The bulging portions 60a–60d are displaced radially inwardly under reactive forces from the fourth slanted surface 84, forcing engaging portions 62a–62d of the chuck 54 to grip the outer circumferential surface of the fluid tube. The fluid tube is now retained against removal by the tube coupling 80.

Although certain preferred embodiments of the present invention have been shown and described in detail, it should be understood that various changes and modifications may be made therein without departing from the scope of the appended claims.

What is claimed is:

1. A tube coupling comprising:

a cylindrical coupling body, said cylindrical coupling body having an annular recess disposed inside said cylindrical coupling body and an upper end, said annular recess having a tapered surface, and defining a step having an oppositely tapered surface;

a chuck disposed in said cylindrical coupling body and having an engaging portion on a distal end thereof for gripping a tube inserted in the cylindrical coupling body;

guide means for holding said chuck slidably therein, said guide means having an outwardly projection flange at an upper end thereof and an annular ledge at a lower end thereof, wherein said flange is fitted over said upper-end of the coupling body and said annular ledge is fitted into said annular recess engaging said step, a cylindrical slanted surface being formed between said upper end of said cylindrical coupling body and said step said guide means further having an inner cylindrical surface in substantial alignment with a proximal portion of the chuck for sliding contact therewith, and an inner conical tapered surface adjacent said inner cylindrical surface, wherein the proximal portion of said chuck is slidable in contact with and along said inner cylindrical surface between an uppermost and a lowermost position within said guide means;

a release bushing disposed in said cylindrical coupling body for insertion between the tube inserted in the cylindrical coupling body and said chuck, said release bushing being slidable along an inner cylindrical surface of said flange; and a gasket disposed in said cylindrical coupling body for sealing a distal end of the tube with respect to an inner wall of said cylindrical coupling body through compression of said gasket;

said chuck having a bulging portion projecting radially outwardly from said proximal portion, such that when said bulging portion is drawn into said guide means by sliding said chuck toward said uppermost position of said guide means, the bulging portion is slidingly engaged and pushed radially inwardly by said conical tapered surface, causing said engaging portion of the chuck to be displaced radially inwardly into gripping engagement with the tube inserted in said cylindrical coupling body;

wherein, prior to insertion of said tube when said gasket is in an uncompressed state, said gasket is spaced a predetermined distance from said distal end of said chuck when the chuck is in said lowermost position in said guide means, with no intervening elements disposed between said chuck and said gasket.

2. A tube coupling according to claim 1, wherein said guide means comprises a guide member fixedly disposed coaxially in said cylindrical coupling body and having said inner cylindrical surface in substantially alignment with said proximal portion of the chuck, said chuck being slidably held in said guide member.

3. A tube coupling according to claim 1, wherein said guide means is disposed as part of an inner wall of said cylindrical coupling body.

4. A tube coupling according to claim 1, wherein said chuck has an outwardly projecting tooth on an outer circumferential surface of an opposite end thereof, said guide means having a recess or hole defined in an inner wall thereof and having a predetermined axial length, said outwardly projecting tooth being slidably disposed in said recess or hole, whereby said chuck is slidable only in a stroke depending on said predetermined axial length with respect to said guide means, said engaging portion having a distal end spaced from said gasket at all times.

5. A tube coupling according to claim 2, wherein said chuck has an outwardly projecting tooth on an outer circumferential surface of an opposite end thereof, said guide means having a recess or hole defined in an inner wall thereof and having a predetermined axial length, said outwardly projecting tooth being slidably disposed in said recess or hole, whereby said chuck is slidable only in a stroke depending on said predetermined axial length with respect to said guide means, said engaging portion having a distal end spaced from said gasket at all times.

6. A tube coupling according to claim 3, wherein said chuck has an outwardly projecting tooth on an outer circumferential surface of an opposite end thereof, said guide means having a recess or hole defined in an inner wall thereof and having a predetermined axial length, said outwardly projecting tooth being slidably disposed in said recess or hole, whereby said chuck is slidable only in a stroke depending on said predetermined axial length with respect to said guide means, said engaging portion having a distal end spaced from said gasket at all times.

* * * * *